Patented Apr. 27, 1948

2,440,658

UNITED STATES PATENT OFFICE 2,440,658

SALICYLOYL-BETA ALANIDE

Harold Urist and Gustav J. Martin, Philadelphia, Pa., assignors to The National Drug Company, Philadelphia, Pa., a corporation of Pennsylvania No Drawing. Application April 29, 1946, Serial No. 665,892

1 Claim. (Cl. 260—519)

This invention relates to a new chemical compound and a process for its production, and more particularly refers to salicyloyl beta alanide, which has been found to be of considerable importance as a chemotherapeutic agent.

It is an object of this invention to prepare a new chemotherapeutic agent which is more effective against bacterial than sulfanilamide and antibiotics. A further object is to prepare salicyloyl beta alanide.

These objects are obtained by reacting beta alanine and salicyloyl chloride. The reaction is preferably carried out employing an aqueous solution of beta alanine and reacting this material with salicyloyl chloride in the presence of sodium hydroxide. It may be more readily understood from a consideration of the following detailed example.

Example

A mixture of 18 grams acetylsalicylic acid, 20 cc. thionyl chloride, and 2 drops of anhydrous pyridine was heated at 50° C. for 1 hour. The excess thionyl chloride was then distilled in vacuo, leaving acetyl salicyloyl chloride as the reaction product.

To a solution of 17.6 grams of beta alanine in 50 cc. of water was added slowly over a period of 15 minutes, with stirring and cooling, 15.6 grams of salicyloyl chloride and 25 cc. of 50% sodium hydroxide solution. The stirring was continued for another 45 minutes, allowing the solution to rise gradually to room temperature. The solution was then acidified and an oil or solid precipitated. The mother liquor was decanted and the residue was dissolved in excess sodium hydroxide solution and heated on a steam bath for 15 minutes. The solution was acidified and the precipitate which occurred was collected, dried, washed well with ether to remove any unreacted salicylic acid, and recrystallized twice from water. Approximately 10 grams of salicyloyl beta alanide was obtained in the form of white needles melting at 152–153° C. This corresponded to a yield of 50%. Calculated N 6.70%. Found 6.78 and 6.80%.

The use of pyridine in the above example was found to be helpful since it acted as a catalyst and thus speeded the reaction. Further, it permitted the reaction to be conducted at a lower temperature so the hydrolysis of acetyl salicylic acid was reduced to a minimum.

It is to be understood that the above described process may be modified appreciably with respect to the conditions of reaction without departing from the scope of this invention. It is contemplated that the individual reactants may likewise be varied, including the employment of derivatives of either or both of the major reactants, i. e., acetyl salicylic acid and beta alanine. As far as we have been able to determine such derivatives of the ultimate product would likewise be of value as chemotherapeutic agents, although salicyloyl beta alanide is the preferred embodiment of this invention and appears to be especially effective when used as a chemotherapeutic agent.

The compounds of this invention, and in particular salicyloyl beta alanide, are very satisfactory as antibacterials and also as analgesics. They are effective against staphylococcus, streptococcus, pneumococcus, and other pathogenic bacteria in either vivo or vitro. For instance salicyloyl beta alanide was found to be effective against bacterial such as Escherichia coli and streptococci in concentrations of 10 micrograms per cc.

As many apparently widely different embodiments of this invention may be made without departing from the spirit and scope hereof, it is to be understood that the invention is not limited to the specific embodiments described herein, except as defined in the appended claim.

We claim:

Salicyloyl beta alanide.

HAROLD URIST.
GUSTAV J. MARTIN.

REFERENCES CITED

The following references are of record in the file of this patent:

UNITED STATES PATENTS

| Number | Name | Date |
|---|---|---|
| 2,160,413 | Dohrn | May 30, 1939 |

OTHER REFERENCES

Fichter et al., Helvitica Chim Acta., vol. 3 (1920), page 712.

Fischer, Berichte Deut. Chem. Gesell., vol. 42 (1909), pages 219–222.